CARRIER-ELIMINATED SINGLE-SIDE-BAND RADIO RECEIVER

Filed April 27, 1960 2 Sheets-Sheet 1

INVENTOR
Irwin D. Baumel

BY James and Franklin
ATTORNEYS

CARRIER-ELIMINATED SINGLE-SIDE-BAND RADIO RECEIVER

Filed April 27, 1960 2 Sheets-Sheet 2

INVENTOR
Irwin D. Baumel

BY James and Franklin
ATTORNEYS

United States Patent Office 3,076,141
Patented Jan. 29, 1963

3,076,141

CARRIER-ELIMINATED SINGLE-SIDE-BAND RADIO RECEIVER

Irwin D. Baumel, Jericho, N.Y., assignor to Crosby-Teletronics Corporation, Syosset, N.Y., a corporation of New York Filed Apr. 27, 1960, Ser. No. 25,089
10 Claims. (Cl. 325—329)

This invention relates to communication systems and more particularly to systems for the correction of the frequency shift of a carrier-eliminated single-sideband speech signal such that the detected speech signal will always remain completely intelligible.

The primary object of this invention is to improve radio reception of voice intelligence, or other modulation having a predictable average energy frequency.

A further object of the invention is to provide a system for the correction of the tuning of a voice communication signal that has been subjected to Doppler frequency shift. This may occur as the signal is being received from a high speed aircraft in motion relative to the receiver, or by a receiver in a moving aircraft receiving a signal from a fixed station. If both transmitted and received signals are generated and received respectively by two aircraft in motion relative to one another, their relative speed and the resulting frequency shift is even greater.

Another object of the present invention is to correct for frequency instability of the local oscillator of the receiver. This relieves some of the stability requirements in the design of the local oscillator, which have been very stringent in single-sideband suppressed-carrier receivers.

A further object of the invention is to provide an indication of the correctness of the tuning of a carrier-eliminated single-sideband signal.

To accomplish the foregoing general objects, and other more specific objects which will hereinafter appear, my invention resides in the carrier-eliminated single-sideband receiver system, and the elements thereof, and their relation one to another, as are hereinafter more particularly described in the following specification. The specification is accompanied by drawings in which:

FIG. 3 is a more detailed circuit diagram showing a part of the circuit of FIG. 1 and FIG. 2.

Figure 1:
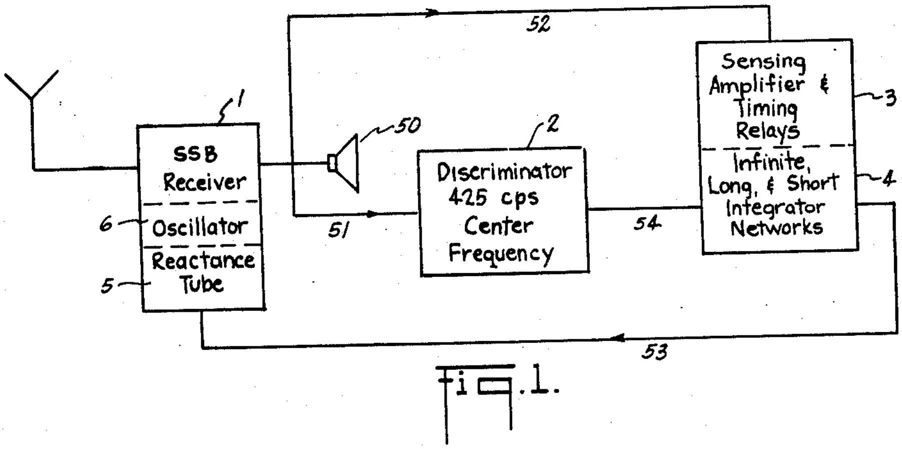
FIG. 1 is a block diagram for a system embodying features of my invention, used for narrow range pull-in or correction.

In the present state of the art, a frequency stability and correction problem exists in carrier-eliminated single-sideband reception. A single-sideband signal, with the carrier suppressed to a level that may be considered negligible, is received. The signal is heterodyned with a first oscillator in a mixer, and converted to an intermediate frequency used in single-sideband circuitry. The intermediate frequency is determined in most cases by the frequency of the mechanical or crystal sideband filter. It is then common practice to further mix the intermediate frequency signal with a stable local oscillator signal in a product detector. The oscillator, usually crystal controlled, is at a frequency corresponding to that of the suppressed carrier relative to the sidebands at the intermediate frequency. This oscillator is sometimes called a "carrier reinsertion" oscillator.

If the first oscillator drifts, or is detuned, the resulting output signal is that of the sidebands beating with a signal having the wrong reinsertion (or carrier) oscillator frequency. The sound is uncomfortable to listen to, and if shifted sufficiently, becomes completely unintelligible.

The same result obtains if the incoming carrier-eliminated sideband signal is shifted in frequency, while all oscillators in the receiver remain fixed in frequency. Shifting of this kind will occur in the case of radio transmission from a high speed aircraft or missile having significant velocity relative to the receiver.

In the prior art of single-sideband reception, automatic frequency control and/or tuning indicator potentials were obtained from discriminator networks which were fed by the carrier, either the transmitted full carrier, or the transmitted pilot carrier. Such a system operates successfully for transmission in which either a full carrier or a reduced pilot carrier is radiated, but is not adaptable to that type of single-sideband transmission in which only the sideband is radiated, while the carrier is wholly suppressed. The present invention provides an automatic frequency control system which will operate on such transmissions, i.e., on a carrier-eliminated single-sideband transmission.

The invention depends upon an inherent quality of the voice, which is that there is an average energy frequency within the voice spectrum which is determinable, and which will consistently fall within reasonably small limits of a specific value. There are several variables that determine the average energy frequency, including the location of the instantaneous voice frequency components; the amplitude and energy content of each component; the frequency of occurrence of each component; and the length of "on" period of each component.

It is definitely known that each of these variables will change from person to person. However, the combination of all these variables, when integrated, has been shown to provide an average energy frequency which is within plus or minus 20 cycles of a specific frequency. The specific frequency is dependent upon the characteristics of the system of transmission that is used. As will be shown later, these items can be taken into account and easily compensated for.

The accuracy with which an average energy frequency can be determined, is dependent upon the length of integration time over which the voice speech is sampled.

Referring now to the drawings, and more particularly to FIGURE 1, a single-sideband receiver 1 receives and detects a carrier-eliminated single-sideband signal. The carrier is supplied by a local oscillator 6. The audio output is reproduced in transducer 50. Some of the audio is also conducted by line 51 to a discriminator 2, the zero center frequency of which is the average energy frequency of the voice spectrum. For the sake of illustration, and as has been found in a system having uniform response, in a voice speech spectrum of from 300 to 3000 cycles, the average energy frequency is approximately 425 cycles. Should the average energy frequency of the detected audio signal be other than 425 cycles, then the heterodyne oscillator 6 in the single sideband receiver is corrected in frequency so that the audio output does have an average energy frequency of 425 cycles.

Before the discriminator output can be applied to the oscillator correction circuitry 5, the rate of correction or integration time must be considered. This is done in blocks 3 and 4. If too short a charge and discharge time constant circuit is used at the output of the discriminator, it will be found that the oscillator changes or attempts correction at a rate that makes the audio output uncomfortable to listen to, and possibly unintelligible. Should the integration time be too long, then too much information may be lost at the beginning of a speech phrase. In order to compromise this situation, a speech sensing and time constant switching network is used, this being located in blocks 3 and 4.

Some of the audio output is fed thru line 52 to an amplifier and two Schmidt triggers used to activate two relays in box 3. There are, in effect, three integration times. The first is effectively infinite, the second is long relative to a speech phrase, and the third is short. The infinite time constant is used to retain the last adjustment or to prevent attempted spurious correction when there is no speech information present at all, for example in pauses between words or sentences. The short time constant is used to make a fast initial or rough correction when speech first appears at the output of the single sideband receiver, and so to bring the audio signal within the region of intelligibility. The long time constant makes a more exact correction of the oscillator, so that the signal is brought within several cycles of the desired frequency, with increased intelligibility.

It has been previously stated that the accuracy with which the average energy frequency can be determined is dependent upon the length of integration time during which the voice speech is sampled. This is set in block 4. It has been found that sampling of voice speech for a period of approximately 100 milliseconds, will determine the average energy frequency of speech within plus or minus 100 cycles. It also has been found that speech subject to this error is intelligible under medium signal-to-noise conditions. The component values in the discriminator integrator network are so chosen that for the short time constants circuit, rapid correction is permitted to within 100 cycles. The relay is so timed that it is switched from the short time constant after approximately 100 milliseconds of speech signal. It may be found desirable to shorten or to lengthen this first or short time constant, as signal-to-noise ratio conditions vary. Automatic circuitry may be incorporated to do this, or adjustments can be made manually. This is partially the case in the more detailed circuitry shown in FIGURE 3, which will be described later.

The output from block 4 is led via line 53 to block 5 in which a reactance tube circuit is employed to correct the frequency of the local oscillator in block 6.

Blocks 3 and 4 also prevent spurious correction when no speech is being received, and the manner in which this is accomplished is also described later.

The system of FIG. 1 may be considered to be one intended for narrow band pull-in. It will cover a variation of signal frequency (or Doppler shift) of plus or minus 300 cycles, which is adequate for most practical cases, including high speed aircraft or missiles. However, with more complex circuitry a very broad band pull-in may be provided, including a band as broad as the band width of the receiver itself.

Figure 2:
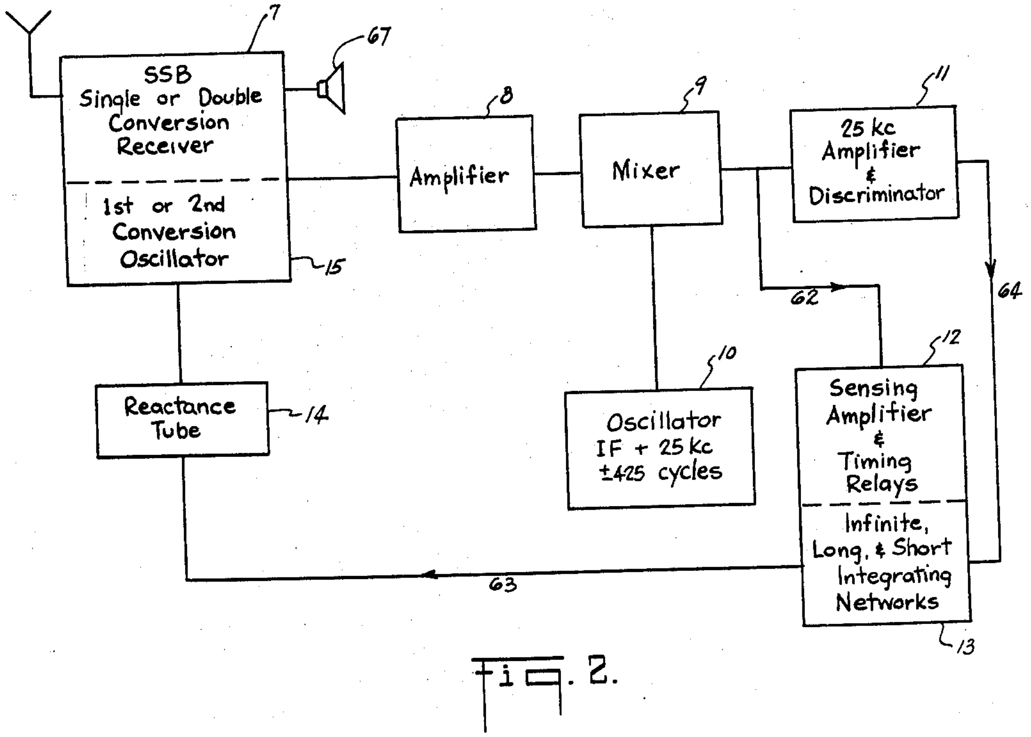
FIG. 2 is a block diagram showing a more elaborate circuit which may be used for broad range pull-in or correction.
Figure 2:
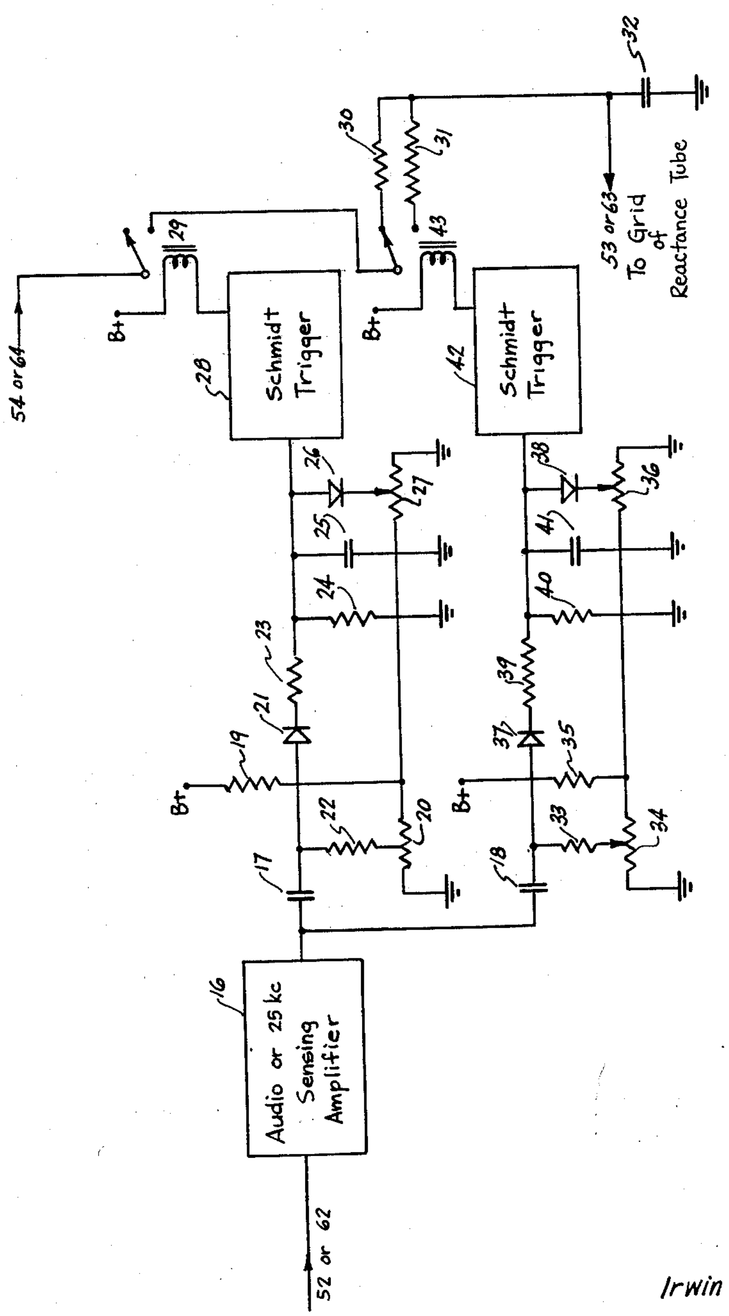

Reference is now made to FIGURE 2, which shows a block diagram for a broadband pull-in system. A carrier-eliminated single-sideband signal with voice speech modulation is received by the single-sideband, single or double conversion receiver 7. The signal is sampled at the output of the first intermediate frequency amplifier, and applied to a tuned amplifier 8. This signal is then applied to a mixer 9 where it is heterodyned with an oscillator signal generated by an oscillator 10 that is oscillating at a frequency equal to the intermediate frequency plus 25 kc., plus or minus the average energy frequency. For illustration purposes, the average energy frequency is assumed to be approximately 425 cycles per second. The reason for saying plus or minus, is that one is used for reception of an upper side band signal, and the other for reception of a lower sideband signal. 25 kc. is chosen as the difference frequency for convenience, but other difference frequencies may be equally convenient. The mixer output is then a speech signal with its average energy frequency at 25 kc.

The output signal from the mixer 9 is then applied to a tuned amplifier and discriminator 11 having a center tuned frequency of 25 kc. The D.C. output of the discriminator is applied thru line 64 to the infinite, long, and short integrating networks in block 13. These networks are switched by the sensing amplifier and timing relays in block 12, and act in the same manner as was described above for the narrow band pull-in system described in FIGURE 1. The output of the integrating networks is applied thru line 63 to the reactance tube circuit in block 14, and this varies the frequency of the first or second conversion oscillator 15, whichever is to be used. An introduced error due to Doppler shift of the incoming signal, or drift of the local oscillators in the receiver, will cause the reactance tube to be activated in such a way that the oscillator frequency is changed in proper direction to correct the signal.

It will be seen that when the receiver is tuned properly, and the signal as sampled at the output of the first IF amplifier has its average energy frequency proper for subsequent carrier reinsertion, then the output of mixer 9 has the average energy frequency of the speech signal located at exactly 25 k.c. Should there be a shift in the signal frequency, the 25 k.c. center tuned discriminator 11 provides a D.C. signal at its output which D.C. signal is of proper polarity to activate the reactance tube and change the frequency of the oscillator 15 in proper direction to compensate for the shift in signal frequency.

Reference is now made to FIGURE 3, which shows the sensing amplifier and timing relays in greater detail. A signal is applied to an amplifier 16. This is an audio amplifier in block 3 of FIG. 1, or a 25 kc. amplifier in block 11 of FIG. 2. The signal source is as shown in FIGURES 1 and 2. The output signal is then coupled via coupling capacitors 17 and 18 to two networks of resistors, diodes and condensers that serve the function of rectifying the audio (or 25 kc.) signal, and of filtering the rectified outputs to permit application to two Schmidt triggers. A biased diode in this network limits the maximum D.C. that can be applied to the Schmidt trigger input in both circuits.

The Schmidt trigger is also known as a cathode coupled binary. It is not described in detail because it is well known, and reference may be made to "Pulse and Digital Circuits" by Millman and Taub, published by McGraw-Hill. The Schmidt trigger is described on page 164 of the book.

Resistors 19 and 20 are a voltage divider used to so bias the high rectifier diode 21 that the conduction of the diode 21 will not start until the signal input exceeds the noise level input. Resistor 22 is necessary to keep the amplifier load impedance high. This may also be a choke. The network consisting of resistors 23, 24, and condenser 25 filters out and eliminates components above thirty cycles per second. This means that a D.C. signal is applied to the Schmidt trigger in a thirtieth of a second when speech is present, that is for each syllable, and no signal is applied when there is no speech.

A diode 26 is so biased by a voltage dropping network 19 and 27 that the D.C. input to the Schmidt trigger 28 cannot exceed a predetermined value. The purpose of this is to permit a constant Schmidt trigger recovery time. The relay 29 at the output of the Schmidt trigger will open or close the line between the discriminator and the reactance tube. When the relay is open, there is, in effect, an infinite resistance in the discriminator integrating circuit. When the relay is closed, zero resistance is placed in series with one or another of the two resistances of the integrating circuits.

These circuits consist of the low value or short time constant resistor 30, the high value or long time constant resistor 31, and the capacitor 32. In effect there are two integrating circuits, one with a shorter and the other with a longer time constant. The condenser 32 is used in common.

In the second network consisting of resistors, diodes and condensers, the resistors 33, 34, 35, and 36, and the diodes 37 and 38, provide the same functions as resistors 19, 20, 22, and 27, and diodes 21 and 26, respectively in the previously described circuitry. Resistors 39 and 40 and condenser 41 filter all rectified components greater than between five and ten cycles per second. The effect is that the Schmidt trigger 42 is not caused to switch until approximately one hundred or two hundred milliseconds after the start of speech. The relay 43 in turn therefore does not switch resistor 31 (instead of resistor 30) into the circuit until one hundred or two hundred milliseconds after the start of speech.

The operation of the system may be summarized as follows. When each syllable starts or stops, relay 29 closes or opens its switch contact. With no speech, the switch contacts are normally open, and there is no change of oscillator frequency. During the first one hundred milliseconds of speech, the short time constant resistor 30 is in the circuit, and capacitor 32 is permitted to charge up rapidly. This, in turn, rapidly corrects the oscillator toward a frequency that is within one hundred cycles of the correct frequency. At the end of the approximate one hundred millisecond time period, the Schmidt trigger 42 switches higher resistor 31 into circuit and removes resistor 30. Integration time is then long, and from that time on any changes of the potential on the reactance tube grid are slow. Correction to within plus or minus ten cycles of the correct oscillator frequency is then accomplished.

It may be noted that the time previously stated as one hundred (or two hundred) milliseconds is actually a variable, and is dependent on the amplitude of the signal at the output of the audio or 25 kc. amplifier 16. This, however, is a desirable feature, because the increased input signal level also implies an increased signal level being applied to the discriminator. Since the discriminator output is proportional to signal input, it may be said that the sensitivity of the system has been increased. Increased sensitivity is desirable in order to shorten the period of time during which the short-time constant resistor 30 is in the circuit.

The quantitative values used in one specific example of my invention may be given with reference to FIG. 3 of the drawing. The capacitor 17 was 0.1 microfarad; the resistor 22 was 47K ohms; the potentiometer 20 was 50K ohms; and the anode resistor 19 was 47K ohms. The resistor 23 was 47K ohms; the resistor 24 was 100K ohms; the capacitor 25 was 0.1 mf.; and the resistor 27 was 50K ohms.

The capacitor 18 was 0.1 mf.; the resistor 33 was 47K ohms; the potentiometer 34 was 100K ohms; the plate resistor 35 was 180K ohms; the series resistor 39 was 2.2 megohms; the resistor 40 was 200K ohms; the capacitor 41 was 1.5 mf., and the potentiometer 36 was 100K ohms. The short time constant resistor 30 was 100K ohms, and the long time constant resistor 31 was 4.7 megohms, while the capacitor 32 was 6.0 mf. All four rectifiers 21, 26, 37 and 38 were alike, and were type 1N459.

It will be understood that the foregoing quantitative values are given solely by way of exemplification, and not in limitation of the invention.

It is believed that the theory, construction, and operation of my invention, as well as the advantages thereof, will be apparent from the foregoing detailed description. It will also be apparent that while I have shown and described the invention in several preferred forms, changes may be made in the circuits shown without departing from the scope of the invention as sought to be defined in the following claims. In the claims the reference to carrier-insertion oscillator is intended to apply to either local oscillator when the receiver has more than one local oscillator. The reference to using a part of the audio output is not intended to exclude systems like FIG. 2 in which intermediate frequency energy is sampled and heterodyned. The term "average energy frequency" has the meaning given near the beginning of this specification, and applies to an inherent quality revealed by integration with appropriate time constant of voice speech, and which quality is substantially independent of the individual doing the speaking.

I claim:

1. A receiver system for a single side-band carrier-eliminated speech signal, said system comprising a receiver which includes a local oscillator for carrier reinsertion, means to integrate with appropriate time constant a part of the audio output of the receiver to obtain an indication proportional to the average energy frequency, means to compare the resulting average energy frequency of the audio output with a normal average energy frequency, means responsive to any difference in average energy frequency to change the frequency of the local oscillator in that direction which helps restore the average energy frequency of the audio output to the normal average energy frequency, and means to prevent the making of a spurious frequency correction when no speech is being received.

2. A receiver system for a single side-band carrier-eliminated speech signal, said system comprising a receiver which includes a local oscillator for carrier reinsertion, means responsive to a part of the audio output of the receiver to compare the average energy frequency of the audio output with a desired average energy frequency, means responsive to any difference in average energy frequency to change the frequency of the local oscillator in that direction which helps restore the average energy frequency of the audio output to the desired average energy frequency, means whereby the frequency of the audio output is averaged over a desired short time period, and for audio frequencies above a selected lower frequency limit of about thirty cycles per second.

3. A receiver system for a single side-band carrier-eliminated speech signal, said system comprising a receiver which includes a local oscillator for carrier reinsertion, means responsive to a part of the audio output of the receiver to compare the average energy frequency of the audio output with a desired average energy frequency, means responsive to any difference in average energy frequency to change the frequency of the local oscillator in that direction which helps restore the average energy frequency of the audio output to the desired average energy frequency, means whereby the frequency of the audio output is averaged over a desired long time period, and for audio frequencies above a selected lower frequency limit of about five cycles per second.

4. A receiver system for a single side-band carrier-eliminated speech signal, said system comprising a receiver which includes a local oscillator for carrier reinsertion, means responsive to a part of the audio output of the receiver to compare the average energy frequency of the audio output with a desired average energy frequency, means responsive to any difference in average energy frequency to change the frequency of the local oscillator in that direction which helps restore the average energy frequency of the audio output to the desired average energy frequency, means whereby the frequency of the audio output is first averaged over a short period and is used to make a rough frequency correction, and means whereby the frequency of the audio output is thereafter averaged over a longer period and is used to make a more exact frequency correction.

5. A receiver system for a single side-band carrier-eliminated speech signal, said system comprising a receiver which includes a local oscillator for carrier reinsertion, means responsive to a part of the audio output of the receiver to compare the average energy frequency of the audio output with a desired average energy frequency, means responsive to any difference in average energy frequency to change the frequency of the local oscillator in that direction which helps restore the average energy frequency of the audio output to the desired average energy frequency, means to prevent the making of a spurious frequency correction when no speech is being received, means whereby the frequency of the audio output is first averaged over a short period and is used to make a rough frequency correction, and means whereby the frequency of the audio output is thereafter averaged over a longer period and is used to make a more exact frequency correction.

6. A receiver system for a single side-band carrier-eliminated speech signal, said system comprising a receiver which includes a local oscillator for carrier reinsertion, a discriminator responsive to a part of the audio output of the receiver to compare the average energy frequency of the audio output with a desired average energy frequency, a reactance tube circuit responsive to any difference in average energy frequency to change the frequency of the local oscillator in that direction which helps restore the desired average energy frequency, a control network receiving another part of the audio output of the receiver and comprising a rectifier and a low pass filter connected to a Schmidt trigger operating a relay, the low pass filter serving to provide a desired delay, a time-constant integrating circuit adapted to be connected between the discriminator and the reactance tube circuit by the relay, the relay contacts being open when there is no speech and being closed after the desired delay when there is speech.

7. A receiver system for a single side-band carrier-eliminated speech signal, said system comprising a receiver which includes a local oscillator for carrier reinsertion, comparison means responsive to a part of the audio output of the receiver to compare the average energy frequency of the audio output with a desired average energy frequency, frequency adjusting means responsive to any difference in average energy frequency to change the frequency of the local oscillator in that direction which helps restore the desired average energy frequency, first and second control networks receiving another part of the audio output of the receiver, the first control network including a short delay means and a first relay, the second control network including a longer delay means and a second relay, a short time-constant integrating circuit and a long time-constant integrating circuit adapted to be connected between the comparison means and the frequency adjusting means, the first relay contacts being open when there is no speech and closed after the short delay when there is speech, the said contacts being connected in series with the movable contact of the second relay, the latter having two fixed contacts one of which is connected to the short time-constant integrating circuit, and the other of which is connected to the long time-constant integrating circuit, whereby the second control circuit shifts the frequency control from the short time-constant circuit to the long time-constant circuit after the longer delay.

8. A receiver system for a single side-band carrier-eliminated speech signal, said system comprising a receiver which includes a local oscillator for carrier reinsertion, comparison means responsive to a part of the audio output of the receiver to compare the average energy frequency of the audio output with a desired average energy frequency, frequency adjusting means responsive to any difference in average energy frequency to change the frequency of the local oscillator in that direction which helps restore the desired average energy frequency, first and second control networks, said control networks receiving another part of the audio output of the receiver and each comprising a rectifier and a low pass filter connected to a circuit operating a relay, the low pass filter of the first control network serving to provide a short delay, and the low pass filter of the second control network serving to provide a longer delay, a short time-constant integrating circuit and a long time-constant integrating circuit adapted to be connected between the comparison means and the frequency adjusting means, the relay contacts of the first control circuit being open when there is no speech and closed after the short delay when there is speech, the said contacts being connected in series with the movable contact of the relay of the second control circuit, the latter having two fixed contacts one of which is connected to the short time-constant integrating circuit, and the other of which is connected to the long time-constant integrating circuit, whereby the second control circuit shifts the frequency control from the short time-constant circuit to the long time-constant circuit after the longer delay.

9. A receiver system for a single side-band carrier-eliminated speech signal, said system comprising a receiver which includes a local oscillator for carrier reinsertion, a discriminator responsive to a part of the audio output of the receiver to compare the average energy frequency of the audio output with a desired average energy frequency, a reactance tube circuit responsive to any difference in average energy frequency to change the frequency of the local oscillator in that direction which helps restore the desired average energy frequency, first and second control networks, said control networks receiving another part of the audio output of the receiver and each comprising a rectifier and a low pass filter connected to a Schmidt trigger operating a relay, the low pass filter of the first control network serving to provide a short delay, and the low pass filter of the second control network serving to provide a longer delay, a short time-constant integrating circuit and a long time-constant integrating circuit adapted to be connected between the discriminator and the reactance tube circuit, the relay contacts of the first control circuit being open when there is no speech and closed after the short delay when there is speech, the said contacts being connected in series with the movable contact of the relay of the second control circuit, the latter having two fixed contacts one of which is connected to the short time-constant integrating circuit, and the other of which is connected to the long time-constant integrating circuit, whereby the second control circuit shifts the frequency control from the short time-constant circuit to the long time-constant circuit after the longer delay.

10. A receiver system for a single side-band carrier-eliminated speech signal, said system comprising a receiver which includes a local oscillator for carrier reinsertion, a discriminator responsive to a part of the audio output of the receiver to compare the average energy frequency of the audio output with a desired average energy frequency, a reactance tube circuit responsive to any difference in average energy frequency to change the frequency of the local oscillator in that direction which helps restore the desired average energy frequency, first and second control networks, said control networks receiving another part of the audio output of the receiver and each comprising a rectifier and a low pass filter connected to a Schmidt trigger operating a relay, the low pass filter of the first control network serving to pass frequencies below about thirty cycles per second, and the low pass filter of the second control network serving to pass frequencies below about ten cycles per second, a short time-constant integrating circuit and a long time-constant integrating circuit adapted to be connected between the discriminator and the reactance tube circuit, the relay contacts of the first control circuit being open when there is no speech and closed after $\frac{1}{30}$ second when there is speech, the said contacts being connected in series with the movable contact of the relay of the second control circuit, the latter having two fixed contacts one of which is connected to the short time-constant integrating circuit, and the other of which is connected to the long time-constant integrating circuit, whereby the second control circuit shifts the frequency control from the short time-constant circuit to the long time constant circuit after $\frac{1}{10}$ second.

References Cited in the file of this patent

UNITED STATES PATENTS

| | | |
|---|---|---|
| 2,836,712 | Crosby | May 27, 1958 |
| 2,938,114 | Krause | May 24, 1960 |